2,951,753
METHOD OF MAKING SOIL CONDITIONING MATERIALS

Kenneth Deane Groves, Bryn Mawr, Pa., assignor to American Viscose Corporation, Wilmington, Del., a corporation of Delaware No Drawing. Filed July 28, 1952, Ser. No. 301,395

6 Claims. (Cl. 71—1)

This invention relates to the treatment or conditioning of soil and particularly to the use of particulate hydrophilic film-forming materials, especially hydrophilic cellulosic materials, in soil treatment or conditioning, as a conditioning agent for other hygroscopic substances used in agriculture, or as carriers for auxiliary soil treating or conditioning agents which can be incorporated in or intimately associated with the particulate hydrophilic cellulosic film-forming material.

The treatment or conditioning of soil presents many practical problems which have not been solved with complete satisfaction heretofore. For instance, the application of such soil conditioning agents as fertilizers by spraying the soil with a solution of the fertilizer in a suitable liquid has the disadvantages that (1) the solution is subject to leaching with loss of the fertilizer before it has served its purpose, and (2) due to the difficulty of spraying the solution uniformly on the soil and avoiding excess in local concentrations, it is difficult to avoid damage to the plants and soil. The application of solid fertilizers, such as the present day inorganic or "commercial" fertilizers has the disadvantage that plant damage is often caused by the fertilizer contacting the plants and injuring them by burning. Further, most commercially available inorganic fertilizers contain from 60 to 80 percent inert carrier such as sand or the like, which has no value as food for the plants around which it is applied but which has to be paid for by the purchaser and increases the cost of the fertilizer without contributing to conditioning of the soil or to plant sustenance.

It has also been proposed to cover the surface of soil to be treated or conditioned with sheets of paper in which fertilizers or substances which retard or prevent growth of weeds are incorporated. These sheets are very expensive, unsightly, and easily damaged by wind and heavy rains even when they are pre-treated with special waterproofing agents. Sheets disposed on the surface of the soil also retard the natural flow of air into and out of the soil, which is undesirable since access of air to the plants is necessary to their proper growth.

Various other methods of treating or conditioning soil have been suggested but none of these involves the use of a low-cost particulate hydrophilic film-forming material which is, per se, a soil conditioning agent and which, in addition, has the capacity to absorb controlled amounts of other auxiliary soil conditioning or treating agents and then release them to the soil gradually, and which can be distributed uniformly in or on all portions of the soil to be treated so that a uniform concentration of the conditioner can be obtained with maximum ease and efficiency.

The present invention provides such a soil conditioning material or tilth improving agent for soil and effectively eliminates the aforementioned difficulties by providing a granular or particulate conditioning material which can be spread uniformly on or in the soil using simple implements such as a rake, hoe or harrow, and which, in addition to being most convenient to use, is comparatively inexpensive and has the additional advantage that auxiliary soil conditioning or treating agents which may be associated therewith are released to the soil gradually and are, therefore, effective over a comparatively long period of time.

The soil conditioning material of the invention comprises a particulate hydrophilic film-forming material which is subject to progressive decomposition by bacterial attack or to dilation or swelling by moisture absorption whereby, when the particulate material is applied to the soil, it is decomposed by bacteria or swollen, with eventual disintegration as it absorbs moisture from the soil and atmosphere, and any auxiliary conditioning or treating agent which may be associated with it is released at a comparatively slow and controlled uniform rate concomitantly with the decomposition or swelling of the carrier.

The particulate hydrophilic film-forming material may comprise a cellulosic material such as cellulose hydrate or regenerated cellulose formed by the regeneration of cellulose from viscose, by the precipitation of cellulose hydrate from cuprammonium solutions of cellulose, from solutions of cellulose in other inorganic solvents as a class, such as zinc chloride, or from organic solvent solutions of cellulose as a class, such as solutions of cellulose in quaternary ammonium bases, or by deesterification of cellulose esters such as by denitration of cellulose nitrate. Or the hydrophilic film-forming material may comprise a cellulose ether which is insoluble in but swollen by water, such as water-insoluble, water-swellable hydroxyalkyl ethers, carboxyalkyl ethers and mixed cellulose ethers of that class, cellulose ether xanthates, cellulose xantho-ethers, cellulose thiourethanes and cellulose xantho-fatty acids. Also, the particulate hydrophilic film-forming material may comprise gelatin, casein, deacetylated chitin, water-insoluble water-swellable polyvinyl alcohol, or other material of this general type which is insoluble in but swollen by water. These film-forming materials are also characterized in their characteristic of being non-fibrous in physical structure.

In accordance with the invention, it is found that the mentioned hydrophilic film-forming materials, and particularly regenerated cellulose and the water-swellable cellulose ethers, have remarkable versatility and diverse uses in the agricultural arts. Being subject to disintegration into humus by bacterial and/or weather action, the particulate hydrophilic materials, and particularly the preferred cellulosic materials, are useful, per se, as soil conditioners and may be used, for example, as a mulch. The property of these hydrophilic materials of being decomposed or disintegrated by bacterial or weather action and their capacity to absorb and retain precisely controlled amounts of other chemicals in liquid condition or in the form of suspensions or emulsions presents the possibility of using them as substitutes for natural manure and other humus-building materials.

In using the hydrophilic film-forming materials as carrier for auxiliary soil conditioning or treating agents, the auxiliary agents or compositions comprising them may be applied to the hydrophilic film-forming material while the latter is in film, strip or particulate condition and as a coating which may comprise an adhesive material that serves to anchor or bond the auxiliary agent to the carrier and which may or may not be itself a conditioning agent or corrective for the soil. Or the hydrophilic carrier may be pre-treated with an adhesive and thereafter treated with a particulate auxiliary soil conditioning or treating agent or with a liquid medium containing such an agent, so that, after the carrier is dried, the particles of the auxiliary agent are adhered to the surface or surfaces of the carrier. For example, the hydrophilic film-forming carrier or base may be provided with a coating comprising, for instance, a nitrogenous adhesive which is a fertilizer, such as animal glue or casein, and conjointly with the application of the adhesive or subsequently thereto, and while the glue, casein or the like is in the adhesive condition, there may be applied a particulate auxiliary agent such as rotenone dust or the like, which may be deposited on the adhesive coating as such or in the form of a dispersion in a liquid which is a non-solvent for the adhesive, so that after the treated hydrophilic carrier is dried the rotenone dust particles are imbedded in the adhesive and anchored to the carrier thereby.

However, when the hydrophilic film-forming material is used as a carrier for one or more auxiliary soil conditioning or treating agents, it is preferred to impregnate the carrier with the auxiliary agent or agents while the carrier is in gel or swollen condition. This may be accomplished by initially producing the hydrophilic carrier in the form of a gel pellicle and impregnating the gel pellicle, prior to any drying thereof, with an auxiliary soil conditioning or treating agent, or by soaking a previously dried pellicle of the hydrophilic film-forming material, or fragments of such materials, in a swelling liquid and then impregnating it with the auxiliary agent while it is in the swollen state.

For example, a wet regenerated cellulose gel pellicle obtained by extruding viscose into a coagulating and regenerating bath through a suitable film-forming device and subjecting it to the usual after-treating liquids including washing may be impregnated with one or more auxiliary soil conditioning or treating agents in the course of its production by passing it from the after-treating stages through a bath comprising the active agent or a solution, emulsion or dispersion thereof, and thereafter drying the pellicle. In the normal practice of producing regenerated cellulose pellicles for use as wrapping material and the like, the pellicle is passed through an aqueous bath containing a plasticizer before it is washed and dried. For the present purposes, it is generally preferred to omit the plasticizer and to pass the unplasticized gel pellicle through the impregnating bath comprising the soil corrective or the like.

If it is desired to utilize, as carrier for the auxiliary soil conditioning or treating agent, regenerated cellulose which has been dried as a step in its manufacture, the dried pellicle, pieces or fragments thereof, such as cellophane scrap or fibers, may be soaked in water or in a dilute alkaline solution, for instance in 0.5% aqueous solution of sodium hydroxide in the case of cellophane scrap or regenerated cellulose fibers, until the regenerated cellulose is brought to a condition of maximum swelling, and after removal of the alkali, if the soaking medium contained it and removal thereof is desirable to prevent alteration in the pH of the soil, the scrap, fibers or sheet may be treated with an auxiliary soil conditioning or treating agent and thereafter dried. The soaking removes plasticizer which may be present in the scrap or fibers, or reduces it to a negligible amount which does not induce leaching of the auxiliary agent. The swollen scrap cellophane or regenerated cellulose in fiber form may be impregnated with one or more auxiliary agents before drying thereof after the swelling treatment, by soaking the scrap or fibers in a bath comprising the auxiliary agent or agents, by placing the scrap or fibers on a belt or other conveyor moving through the bath, or in any other manner which assures substantially uniform impregnation of the scrap or fibers.

When the regenerated cellulose is in swollen condition at the time it is impregnated with the liquid comprising the auxiliary agents, these agents penetrate into the regenerated cellulose structure and after the structure is dried, they are held within the shrunken, consolidated structure from which they are gradually released to the soil with progressive decomposition of the regenerated cellulose by the soil bacteria.

The particulate soil conditioning material of the invention is obtained by grinding, shredding, cutting or otherwise reducing the sheet, scrap or fibers comprising the hydrophilic film-forming material to obtain a mass of particles which may be very fine or relatively coarse. Particles which pass through a screen of 3 to 20 mesh are satisfactory. As previously indicated, the particulate or granular hydrophilic film-forming material may be used as such in the conditioning or treatment of soil. When it is used as a carrier for other soil conditioning agents, herein called "auxiliary" soil conditioning agents to distinguish them from the hydrophilic film-forming base, the pellicle scrap or fibers formed from the hydrophilic film-forming material may be reduced to particulate condition before or after impregnation thereof with the auxiliary agent or agents.

The hydrophilic film-forming material may be used as a carrier for any volatile or non-volatile liquid or for any particulate solid which is useful in the cultivation of crops or in controlling weeds, pests, diseases and organisms which attack plants and include fertilizers, hormones, trace or minor elements, vitamins and other plant nutrients and chemicals which either beneficially or harmfully affect plant growth.

The auxiliary soil conditioning or treating agent may also be a chemotherapeutic which is applied to the soil and translocated or taken up by a plant or tree to retard the growth of fungus and the action of its toxins on plant or tree tissue. For example, it may be 8-hydroxy quinoline benzoate which is effective in controlling Dutch elm disease.

The auxiliary soil conditioning or treating agent may be applied to the swollen or gel regenerated cellulose or other hydrophilic pellicle (sheet, scrap, fibers or particles) in the form of a solution, dispersion or emulsion, or it may be applied as such or in the form of an emulsion when the auxiliary agent is itself a liquid. Water-soluble agents such as the initially water-soluble polyelectrolyte resins, e.g., hydrolyzed polyacrylonitrile and alkali metal salts of the polymer may be used in the form of solutions thereof in water, while water-insoluble agents may be used in the form of aqueous dispersions or emulsions, in solution in organic solvents if such are practical, or in the form of dispersions or emulsions in oil. For example, a non-fibrous regenerated cellulose film or cellophane scrap, may be passed through or otherwise treated with an aqueous medium comprising one part by weight of a mixture of 1% rotenone and 4% total acetone extractives of derris root and 800 parts of water; with an aqueous solution or dispersion of "Endothal" (disodium-3,6-endoxohexahydrophthalate); or with an aqueous emulsion of dichlorethyl ether containing potash fish-oil soap as the emulsifying agent. Another example of a suitable liquid medium containing an auxiliary agent with which the hydrophilic carrier may be impregnated comprises pentachlorophenol suspended in light oil. The particular form of the medium containing the auxiliary agent will depend on the agent used, whether it is soluble in water, in oil, or in an organic solvent or has to be applied in the form of a dispersion or emulsion. The medium may contain suitable emulsifying and dispersing agents. The medium may also contain other adjuvants such as spreading, wetting and adhesive assistants. In many cases, the liquid in which the auxiliary agent is dissolved or dispersed will also improve the spreading or adhesive properties of the medium. For instance, substances which may be used to produce an emulsion of the active ingredient in an oil vehicle, such as soap, casein, pitch, petroleum sulfonic acids and triethanolamine oleate also function as penetrants. Animal and vegetable oils such as fish oils, cottonseed and soyabean oils, which exert an insecticidal action, are excellent adhesives and may be applied to the carrier as such or as vehicles for other auxiliary agents.

The particulate soil conditioning material of the invention may be distributed on the surface of the soil as a mulch which provides nutrient, eliminates crusting and may smother weeds, or it may be incorporated with the soil to a depth of less than an inch to plow depth. It may be applied as a pre-planting treatment, i.e., before a crop is planted; as the seeds are planted; as a pre-emergence treatment, i.e., after the seeds are planted but before the seedlings emerge from the soil; or it may be incorporated with the soil around the roots of growing plants and trees. Also, the particulate hydrophilic film-forming material, as such or as carrier for auxiliary soil conditioning or treating agents, may be suspended in a suitable liquid and sprayed on the ground thus forming a continuous bond of material applied at the exact areas desired, with the result that the applied chemicals can be controlled both as to area and exact concentration, an advantage which is unique for the soil conditioning materials of this invention.

When the preferred non-fibrous regenerated cellulose or water-swellable cellulose ether is used as a carrier for auxiliary soil conditioning or treating agents it functions, in effect, as a diluent for such other agents and permits more accurate control of the amount of the auxiliary agent introduced into the soil. This control may be had by controlling the amount of the particulate conditioning material applied to the soil taking into consideration the amount of the auxiliary conditioning or treating agent taken up by the swollen pellicle or scrap, which will vary depending on the particular agent and the viscosity of the liquid, if the agent is a liquid, or of the liquid medium or vehicle in which the conditioning agent is dissolved or suspended, as well as the concentration of the auxiliary conditioning agent therein. However, while in this embodiment the particulate regenerated cellulose or the like is a diluent for the auxiliary agent, it is also, per se, a soil conditioning material and therefore it is not an inert material which does not contribute to conditioning of the soil, as is the case with the sand and similar inert substances which have been heretofore used in commercial fertilizer preparations.

It is preferred to dry the impregnated swollen regenerated cellulose or other hydrophilic film-former without intermediate washing thereof between the impregnating and drying steps. In some instances, when the impregnant is an oil or comprises an oil, the surface of the dried carrier may be somewhat oily. This is not generally objectionable, but if desired excess oil may be removed from the surface of the sheet or scrap by mechanical means, for example by means of a wiper roll or the like.

An outstanding advantage of the particulate or granular soil conditioning material of the invention is the ease and convenience by which it can be uniformly broadcast on top of the soil, or mechanically dispersed through the soil for conditioning it in depth by discing, harrowing, or raking, so that the most efficient utilization of the material is realized and excessively heavy local concentration thereof which is harmful in many cases, is avoided.

It will be apparent from the foregoing that the particulate regenerated cellulose or water-swellable water-insoluble cellulose ethers which are decomposable or highly swollen on exposure to moisture have many other advantages for use in treating or conditioning soil. The particulate materials are soil conditioners per se, much the same as manure or a plowed-under crop; being highly water-absorbent they are conditioners for other hygroscopic substances used in agriculture; they are carriers for auxiliary soil conditioning or treating agents such as fertilizers and insecticides; they may be used in the dry granular condition or as a suspension in suitable liquids for providing the soil with a mulch, and prevent or minimize loss by leaching of the auxiliary soil conditioning or treating agents carried thereby before those ingredients have served their purposes.

It will be apparent from the foregoing discussion that the auxiliary agent carried by the particulate hydrophilic film-former may be an agent which is directly beneficial to soil and plants, for instance an agent which changes the soil structure or functions as a fertilizer, or it may be a soil treating agent which is indirectly beneficial or harmful to soil or plants and in the cultivation of crops; for example, an agent which functions as an insecticide or as a weed-killer. Auxiliary agents which directly condition the soil and those which are treating agents or indirect conditioners therefor are both included in the scope of this invention, and when the term "auxiliary soil conditioning agent" is used in the claims it is intended to cover both types of agents, those which are directly beneficial to the soil and plants and those treating agents which are indirectly beneficial or harmful to soil, plants or in the cultivation of crops. By appropriate selection of chemically compatible auxiliary agents the particulate hydrophilic film-former may be used as carrier for a plurality of auxiliary agents having different functions. Thus, the particles of the film-former may carry several compatible auxiliary conditioning and treating agents which function, individually, as fertilizer, insecticide, weed-killer and fungicide so that when the carrier is mixed with or broadcast over the soil all of the mentioned auxiliary agents are applied to the soil simultaneously in a single application of the particulate soil conditioning material.

Also, it is within the scope of the invention to utilize the particulate hydrophilic film-former as a carrier for chemicals which are useful as soil treating agents which reduce dust and minimize the effect of sub-zero weather on soils by lowering the freezing point of water contained in the soil pores, such as calcium chloride. Additionally, the particulate hydrophilic film-former may be used as a carrier for sodium silicate and may be applied to the soil before, after or simultaneously with particles carrying calcium chloride whereby calcium silicate, which possesses high rigidity and compressive strength, is formed in or on the soil by double decomposition reaction between the calcium chloride and sodium silicate.

Further, the auxiliary soil conditioning or treating agent associated or combined with the hydrophilic film-former may be a radio-active substance or radio-isotope which may be a stimulant for plant growth, a useful tool in the study of the utilization of fertilizers and the movement into plants of the nutrients they supply, an aid in the study of fungi that cause plant diseases, a substance which inhibits the growth of fungi, or a substance which is selectively lethal to female insects or male insects or which is lethal to both female and male insects.

A still further embodiment of the invention contemplates the incorporation of the particulate hydrophilic film-former as such or combined with an auxiliary soil conditioning or treating agent, in a film-forming material adapted to be formed into a sheet or film. For example, the particulate soil conditioning material may be incorporated in or distributed through a resin in the thermoplastic state, such as a solution or dispersion of a vinyl resin, which is then cast into a film to obtain a water-resistant resin film having the hydrophilic particles distributed therethrough. Or the particulate soil conditioning material may be incorporated in or distributed through a film-forming cellulosic material such as viscose, for instance, which is then cast to a film of regenerated cellulose having the particulate cellulosic or other hydrophilic film-forming material distributed therethrough. The films or sheets having the particulate hydrophilic film-former distributed through them may be used as such, as protective covering for soil or plants, or they may be reduced to particulate condition for application to the soil.

Since I have found that the particulate hydrophilic film-formers described herein, and especially and preferably regenerated cellulose and the water-insoluble, water-swellable cellulose ethers, are useful as such in the treatment of soil, the invention contemplates soil having those particulate or granular materials associated with it, whether the particles of the hydrophilic materials carry auxiliary soil conditioning and/or treating agents or not.

The term "soil-conditioning" is used herein and in the claims to designate an alteration of the physical characteristics and properties of soil. The term "soil-treating" is used herein and in the claims to designate an alteration of the chemical properties and characteristics of the soil such as fertility, insecticidal characteristics, fungicidal characteristics and the like.

Various modifications and changes may be made in practicing the invention without departing from its spirit and scope, and auxiliary soil conditioning and/or treating agents other than those mentioned specifically herein may be associated with the particulate hydrophilic film-former. Therefore, it is to be understood that the invention is not intended to be limited except as defined by the appended claims.

I claim:
1. A method of making a soil-conditioning material which comprises impregnating a dilated non-fibrous pellicle of a water-insoluble hydrophilic film-forming material with a liquid medium comprising an auxiliary soil-conditioning agent, drying the pellicle, and reducing the pellicle to a mass of particles having the auxiliary soil conditioning agent intimately associated therewith.
2. A method according to claim 1 characterized in that the non-fibrous pellicle comprises regenerated cellulose.
3. A method according to claim 1 characterized in that the non-fibrous pellicle comprises a water-insoluble, water-swellable cellulose ether.
4. The method of making a soil-conditioning material which comprises swelling pre-dried cellophane scrap, impregnating the swollen scrap with a liquid medium comprising an auxiliary soil-conditioning agent, drying the impregnated scrap, and reducing the impregnated scrap to a particulate mass particles of which have the auxiliary soil-conditioning agent intimately associated therewith.
5. The method of making a soil-conditioning material which comprises providing a mass of particles of a water-insoluble hydrophilic film-forming material in swollen condition, impregnating the particles with a liquid medium comprising an auxiliary soil-conditioning agent, and drying the particles to obtain a mass of dried particles having the auxiliary soil conditioning agent intimately associated therewith.
6. A method of making a soil-conditioning material which comprises treating fragments of pre-dried regenerated cellulose with a swelling agent for regenerated cellulose, impregnating the swollen fragments with a liquid medium comprising an auxiliary soil-conditioning agent, drying the impregnated fragments, and reducing the fragments to particulate condition.

References Cited in the file of this patent
UNITED STATES PATENTS

| | | |
|---|---|---|
| 1,171,558 | Taylor | Feb. 15, 1916 |
| 1,930,939 | Horner | Oct. 17, 1933 |
| 2,083,065 | Heyl | June 8, 1937 |
| 2,192,939 | Slayter et al. | Mar. 12, 1940 |
| 2,197,843 | Leeuwen | Apr. 23, 1940 |
| 2,353,372 | Stone | July 11, 1944 |
| 2,515,116 | Dudley | July 11, 1950 |
| 2,625,471 | Mowry et al. | Jan. 13, 1953 |
| 2,625,529 | Hedrick et al. | Jan. 13, 1953 |
| 2,652,379 | Hedrick et al. | Sept. 15, 1953 |

OTHER REFERENCES

Soil Scienc, June 1952, vol. 73, No. 6, pages 427–440.
Colloid Chemistry, Alexander, Reinhold Pub. Corp. N.Y., (1946), vol. VI, page 490.
Journal of Agricultural Science, "The Effects of the Addition to Soil," Quastel et al., vol. 37, No. 3, July 1947, pp. 257–66.